(12) United States Patent
Storm et al.

(10) Patent No.: US 10,984,270 B2
(45) Date of Patent: Apr. 20, 2021

(54) SPOOF DETECTION BY ESTIMATING SUBJECT MOTION FROM CAPTURED IMAGE FRAMES

(71) Applicant: Advanced New Technologies Co., Ltd., George Town (KY)

(72) Inventors: Gregory Lee Storm, Parkville, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/448,995

(22) Filed: Jun. 21, 2019

(65) Prior Publication Data

US 2020/0401827 A1    Dec. 24, 2020

(51) Int. Cl.
*G06K 9/00* (2006.01)
*G06T 7/73* (2017.01)
*G06T 7/246* (2017.01)
*H04M 1/725* (2021.01)

(52) U.S. Cl.
CPC ..... *G06K 9/00906* (2013.01); *G06K 9/00275* (2013.01); *G06T 7/246* (2017.01); *G06T 7/73* (2017.01); *H04M 1/72577* (2013.01)

(58) Field of Classification Search
None
See application file for complete search history.

(56) References Cited

U.S. PATENT DOCUMENTS

| | | | |
|---|---|---|---|
| 9,058,519 B2 * | 6/2015 | Law | G06K 9/00899 |
| 9,117,109 B2 * | 8/2015 | Nechyba | G06K 9/00315 |
| 9,928,603 B2 * | 3/2018 | Martin | G06K 9/00979 |
| 10,659,405 B1 | 5/2020 | Chang et al. | |
| 2011/0050853 A1 * | 3/2011 | Zhang | H04N 13/261 348/44 |
| 2013/0212655 A1 * | 8/2013 | Hoyos | G06K 9/00906 726/5 |
| 2014/0016837 A1 | 1/2014 | Nechyba et al. | |

(Continued)

OTHER PUBLICATIONS

Wikipedia [online], "Fundamental matrix (computer vision)," Jul. 2019, retrieved on Dec. 19, 2019, retrieved from URL<https://en.wikipedia.org/wiki/Fundamental_matrix_(computer_vision)>, 5 pages.

*Primary Examiner* — Soo Jin Park
(74) *Attorney, Agent, or Firm* — Fish & Richardson P.C.

(57) ABSTRACT

A method includes receiving a first image and a second image, wherein the first and second images represent first and second relative locations, respectively, of an image acquisition device with respect to a subject. The method also includes determining, using the first and second images, a total relative displacement of the subject with respect to the image acquisition device between a time of capture of the first image and a time of capture of the second image, and determining, based on sensor data associated with one or more sensors associated with the image acquisition device, a component of the total relative displacement associated with a motion of the image acquisition device. The method also includes determining, based on a difference between the first total relative displacement and the component, that the first subject is an alternative representation of a live person, and in response, preventing access to a secure system.

18 Claims, 6 Drawing Sheets

(56) References Cited

U.S. PATENT DOCUMENTS

2014/0307929 A1    10/2014  Neechyba et al.
2016/0188958 A1*  6/2016  Martin ............... G06K 9/00906
                                                          382/118
2017/0042439 A1     2/2017  Yeow et al.

* cited by examiner

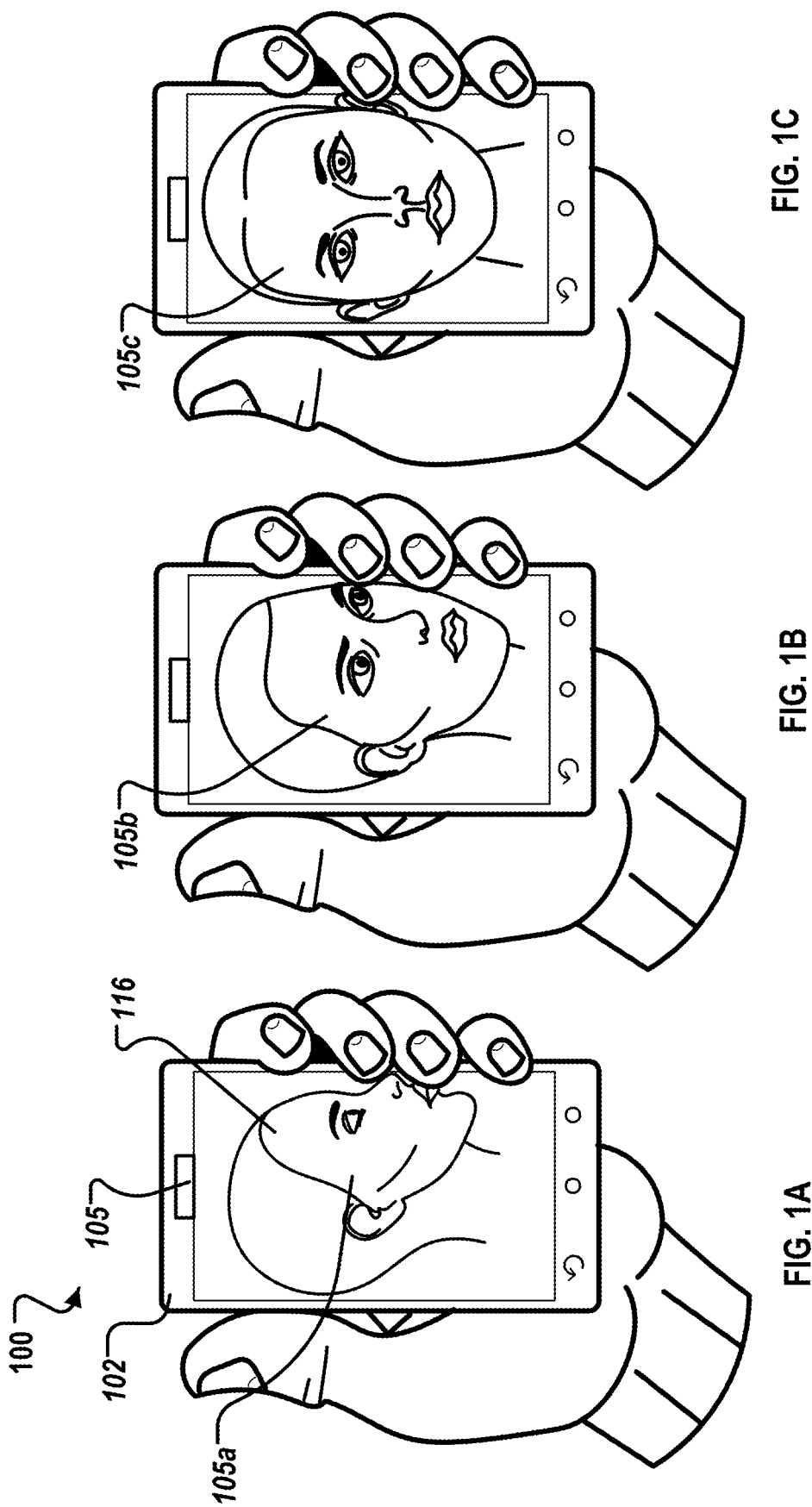

ns with one or more sensors associated<br>e acquisition device, a component of the total<br>splacement associated with a first motion of the<br>quisition device. The image analysis engine is

SPOOF DETECTION BY ESTIMATING SUBJECT MOTION FROM CAPTURED IMAGE FRAMES

TECHNICAL FIELD

This disclosure relates to image capture devices used in biometric authentication.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method that includes receiving, at one or more processing devices, a first image and a second image, wherein the first image represents a first relative location of an image acquisition device with respect to a first subject, and the second image represents a second relative location, different from the first relative location, of the image acquisition device with respect to the first subject. The method also includes determining, by the one or more processing devices and using the first image and the second image, a first total relative displacement of the first subject with respect to the image acquisition device between a time of capture of the first image and a time of capture of the second image. The method further includes determining, based on sensor data associated with one or more sensors associated with the image acquisition device, a component of the total relative displacement associated with a first motion of the image acquisition device. The method also includes determining, based on a difference between the first total relative displacement and the component of the first total relative displacement associated with the first motion of the image acquisition device, that the first subject is an alternative representation of a live person, and in response, preventing access to a secure system.

In another aspect, this document features a system that includes an image acquisition device and an image analysis engine that includes one or more processing devices. The image acquisition device captures a first sequence of images of a first subject over a time period in which relative locations of the image acquisition device with respect to the first subject varies. The image analysis engine is configured to receive the first sequence of images, and select a first image and a second image from the first sequence of images, wherein the first image represents a first relative location of the image acquisition device with respect to the first subject, and the second image represents a second relative location, different from the first relative location, of the image acquisition device with respect to the first subject. The image analysis engine is further configured to determine, using the first image and the second image, a first total relative displacement of the first subject with respect to the image acquisition device between a time of capture of the first image and a time of capture of the second image. The image analysis engine is also configured to determine, based on sensor data associated with one or more sensors associated with the image acquisition device, a component of the total relative displacement associated with a first motion of the image acquisition device. The image analysis engine is further configured to determine, based on a difference between the first total relative displacement and the component of the first total relative displacement associated with the first motion of the image acquisition device, that the first subject is an alternative representation of a live person, and in response, prevent access to a secure system.

In another aspect, this document features one or more non-transitory machine-readable storage devices having encoded thereon computer readable instructions for causing one or more processing devices to perform various operations. The operations include receiving a first image and a second image, wherein the first image represents a first relative location of an image acquisition device with respect to a first subject, and the second image represents a second relative location, different from the first relative location, of the image acquisition device with respect to the first subject. The operations also include determining, using the first image and the second image, a first total relative displacement of the first subject with respect to the image acquisition device between a time of capture of the first image and a time of capture of the second image. The operations further include determining, based on sensor data associated with one or more sensors associated with the image acquisition device, a component of the total relative displacement associated with a first motion of the image acquisition device. The operations also include determining, based on a difference between the first total relative displacement and the component of the first total relative displacement associated with the first motion of the image acquisition device, that the first subject is an alternative representation of a live person, and in response, preventing access to a secure system.

Implementations of the above aspects include one or more of the following features. The image acquisition device can be a camera disposed on a mobile device, and the first and second images is a part of a sequence of images captured as the mobile device is moved relative to the first subject. The alternative representation of the live person can include a photograph of the live person printed on paper, or presented on a display device. Determining the first total relative displacement can include identifying multiple points of interest in the first image, identifying, in the second image, points corresponding to each of the multiple points of interest, determining displacement of the multiple points of interest from the first image to the second image with respect to a reference point, and determining the first total relative displacement of the subject based on the displacement of the multiple points of interest using (i) an estimated distance between the image acquisition device and the subject, and (ii) one or more parameters of the image acquisition device. In some implementations, a fundamental matrix can be determined, wherein the fundamental matrix is indicative of a difference between the orientations of the image acquisition device at the times of capture of the first image and second image, respectively.

In some implementations, a second sequence of images of a second subject can be received, the second sequence being captured by the image acquisition device over a time period in which relative locations of the image acquisition device with respect to the second subject varies. A third image and a fourth image can then be selected from the second sequence of images, wherein the third image represents a first relative location of the image acquisition device with respect to the second subject, and the fourth image represents a second relative location, different from the first relative location, of the image acquisition device with respect to the second subject. One or more processing devices may determine, using the third image and the fourth image, a second total relative displacement of the second subject with respect to the image acquisition device between a time of capture of the third image and a time of capture of the fourth image. Based on sensor data associated with the one or more sensors associated with the image acquisition device, a component of the second total relative displacement may be determined, the component of the second total relative displacement being associated with a second motion of the image acquisition device. A determination may be made, based on a difference between the second total relative displacement and the component of the second total relative displacement associated with the second motion of the image acquisition device, that the second subject is a live person, and in response, an authentication process may be initiated to determine if the live person is authorized to access the secure system.

Various implementations described herein may provide one or more of the following advantages. By capturing a sequence of images during periods of relative movements between a subject and an image capture device, images from multiple viewpoints can be captured using a single camera. Two images captured at two different time points represent a total motion that is a sum of (i) a motion of the subject, and (ii) a motion of the image capture device. By estimating the motion of the image capture device based on sensor inputs from one or more sensors of the image capture device, and subtracting the same from the total motion estimated from the captured images, an estimate of the motion of the subject can be obtained quickly. This in turn can be used to deduce whether the subject is a live human being or a spoof alternative representation such as a photograph (printed on paper or displayed on a screen) or a mask. The technology described herein therefore can allow for a spoof detection system to be implemented on resource-constrained environments such as mobile devices, and/or reduce hardware complexities associated with other devices using image-based biometric authentication. By allowing for a quick discrimination between an image of a live person and an image of a spoof alternative representation, additional processing can be preemptively terminated, thereby creating an additional layer of security.

BRIEF DESCRIPTION OF THE DRAWINGS

FIGS. 1A-1C show a mobile device capturing images of a subject from different relative locations of the subject and the mobile device, as an example environment in which the technology described herein may be used.

Figure 2A:
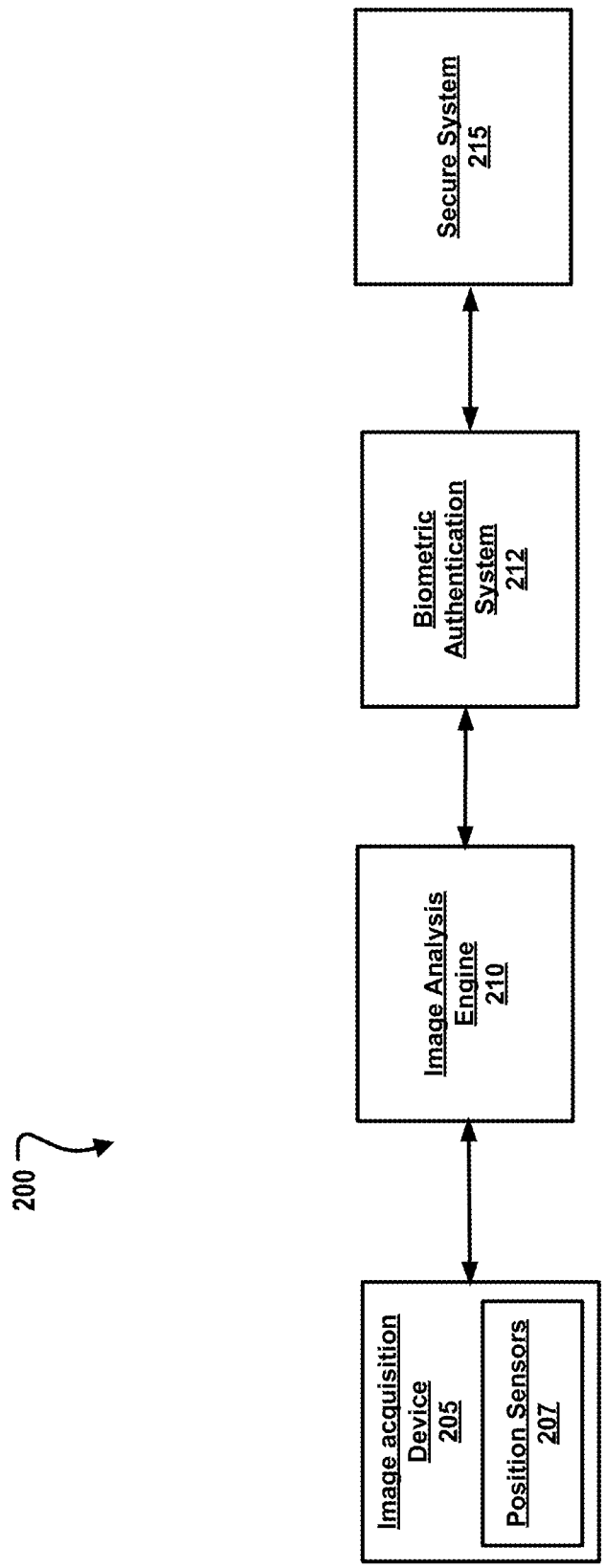
FIG. 2A is an example system that can be used for implementing technology described herein.

Repeat use of reference characters in the present specification and drawings is intended to represent same or analogous features or elements.

DETAILED DESCRIPTION

This document presents an image analysis method in which multiple images captured using an image acquisition device is analyzed to determine if the subject in the images is an actual live person, or an alternative representation (e.g., a photograph or another image of the live person printed on paper, or displayed on a high definition display device) of the live person. Specifically, the technology described herein includes capturing multiple images of a subject using a single image acquisition device (e.g., a camera of a mobile device) from various relative positions of the image acquisition device and the subject, and then determining, from the images, a presence or absence of subject motion. In one example implementation, when a mobile device is used to capture a facial image (e.g., for a face/iris/eyeprint image based biometric authentication process), the mobile device is gradually brought in alignment with the subject. The camera of the mobile device can be triggered to capture a sequence of additional images (e.g., as a series of video frames) over the time period in which the camera is brought in alignment with the subject to capture a final image. The sequence of images capture a total motion of the subject, the total motion being a sum of a subject motion and a motion due to the movement of the device itself. The motion of the device itself is determined based on input data from one or more sensors (e.g., accelerometers, gyroscopes etc.), and is subtracted from the total motion deduced from the captured images. The resulting difference can be used as an estimate of the subject motion, which in turn can be used in determining whether the subject is a live person, or a spoof alternative representation of the live person. For example, if the subject is a photograph or another image of the live person printed on paper, or displayed on a high definition display device, the subject motion is likely to be zero or substantially equal to zero. On the other hand, for a live person, the subject motion is expected to be above a threshold value. Accordingly, an inference can be made that the subject in the captured images is or is not a live person based on the subject motion being above or below the threshold, respectively. As such, the technology described herein allows for fast liveness detection using an image capture device (e.g., a camera, and optionally a flash, of a mobile device), which in turn can be used to preemptively obviate resource-intensive authentication processes.

If the captured images are not determined to correspond to a live person, any further processing of the captured images by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes pre-processing steps that allow for determining whether the captured image corresponds to an actual live person or a spoof alternative representation such as a printed or displayed image/photograph of the live person. Based on detecting that the captured image is a spoof, any further processing of the image to allow access to a corresponding secure system can be prevented, thereby adding an added layer of security to the system. The technology can be used in mobile devices, as well as in larger devices (e.g., kiosk devices) where a subject (and not the device) moves to achieve alignment between the subject and a corresponding camera of the device. Examples of these environments are described next.

FIGS. 1A-1C show a mobile device 102 capturing images of a subject from different relative locations of the subject and the mobile device, as an example environment 100 in which the technology described herein may be used. For example, the mobile device 102 can be used to authenticate a user to one or more services (e.g., a payment processing service) made available to the user via an application executing on the mobile device. The application executing on the mobile device 102 can require the user to be authenticated via a biometric authentication process before allowing access to a secure system associated with the services. In some implementations, a face/iris/eyeprint based biometric authentication process may be used, which in turn may require capture of a facial image of the user.

In the example of FIGS. 1A-1C, the mobile device 102 is used to capture a facial image of a subject, using the camera 104 of the mobile device 102. In an example use-case scenario, the mobile device 102 is gradually lifted towards a face of the subject to capture a final image 105c (in FIG. 1C) that may be usable in a biometric authentication process. However, because the mobile device would likely be aligned to the face gradually over a short time period, a sequence of additional images 105a (FIG. 1A) and 105b (FIG. 1B) may be captured during that time period. Because the relative locations of the mobile device and the subject varies over that time period, the images 105a, 105b, and 105c (105, in general) represent images of the subject as captured from multiple locations of the mobile device 102 with respect to the subject.

In some implementations, the difference in positions, as reflected in the images captured by the camera, can be compared to the corresponding difference in locations sensed by the sensors to determine whether the subject is a live person. For example, because the difference in positions, as reflected in the images, is solely based on what the camera captures, the difference in position would reflect the total motion in the scene, including any motion of the subject, and the motion of the capturing device itself. This can be represented as:

total motion=camera motion+subject motion

In some implementations, the camera motion can be calculated from one or more micro electro-mechanical system (MEMS) sensors such as an accelerometer, gyroscope etc., and the camera motion can then be subtracted from the total motion (as determined from the images) to obtain an estimate of any motion associated with the subject. Because photos and monitors do not typically move (e.g., when a phone is pointed towards a static monitor or photograph), the subject motion associated with spoof alternative representations can be expected to be low, or even substantially equal to zero. On the other hand, a live person is likely to have at least some subject motion, and this difference can be leveraged to discriminate between live subjects and spoofs. For example, if the subject motion is determined to be lower than a threshold (which may be determined empirically), the subject can be determined as a likely spoof. On the other hand, if the subject motion is determined to be higher than the threshold, the subject can be determined likely to be a live person.

In some implementations, the orientation of the mobile device in space can be determined (e.g., by an operating system of the mobile device) using one or more MEMS sensors of the mobile device. In some implementations the phone combines the output from an accelerometer, magnetometer, gyroscope and/or other sensors (sometimes together referred to as the "motion sensors") to determine the phone's location, orientation and heading in 3 dimensional (3D) space. In some implementations, a location is represented by latitude, longitude and altitude, whereas orientation is represented by a three-dimensional vector (X, Y, Z) which represent angles towards "down." Heading can be represented by a vector that includes the angle towards true north as sensed by the device. Such readings can be captured separately at the times the first and second images are taken. In each case, the difference in these readings can be calculated, to represent the total motion the device has encountered between image captures.

The camera motion or device motion can be determined, for example, by determining a distance between capture locations of two images being uses in an analysis. In the example of the mobile device 102 (FIGS. 1A-1C), the relative separation of the locations corresponding to a pair of images (e.g., the image 105a and 105b) can be determined based on sensor outputs from one or more sensors disposed in the mobile device. For example, the relative separation/orientation of capture-locations corresponding to two images can be determined based on an output of one or more of: an accelerometer, a gyroscope, a magnetometer, or another MEMS sensor disposed in the mobile device 102. Optical sensors (e.g., one or more cameras and optical flow sensors), or other sensors that allow for measuring/characterizing movements of the mobile device 102 may also be used. For example, it may be possible to use a wireless module (e.g., a Bluetooth® module or a Wi-Fi module) of the mobile device 102 to detect how the movement of the mobile device in a corresponding wireless network affects (or perturbs) one or more network parameters. Such information may in turn be used to determine location of the mobile device in an environment, and hence used for the purposes described herein.

In some implementations, a photometric stereo process is applied to the first and second images. For example, an assumption can be made that the first image is the "reference" (e.g. because the subject's actual orientation with respect to the camera is not known in general). The movement evident between the first and second images can then be calculated, for example, by 1) finding match points in each image, 2) comparing relative locations of each of those points in each image, 3) determining, using the estimated distance to the subject and one or more camera parameters (i.e. the calibration information on focal characteristics, etc.), how much "motion" the camera sees in the image, and 4) determining the fundamental matrix that describes the difference in orientation of the camera between images (as sensed by the camera). In computer vision, the fundamental matrix F is a 3×3 matrix which relates corresponding points in stereo images. In epipolar geometry terms, if x and x' denote corresponding points in a stereo image pair, and Fx describes the line (often referred to as an epipolar line) connecting x and x', All pairs of corresponding points satisfies the relationship:

$$x^T F x = 0$$

In some implementations, the relative locations or relative poses of the camera (e.g. how much the camera perceives to have moved given the difference in angles, resolution, etc. in the images) can be determined using the two captured images. The amount of displacement between the first image and second image, as determined using the process described above, can be referred to as the total relative displacement, which accounts for both the motion of the camera and any motion of the subject. From this, the motion of the subject can be isolated, for example, by subtracting the motion of the camera, as sensed from the motion sensors of the camera. If the difference—i.e. the calculated motion of the subject—is less than a threshold, the subject in the images can be determined to be a spoof alternative representation rather than a human being. In some implementations, a machine learning engine can be trained to differentiate between live human subjects and spoof alternative representations based on, for example, what the camera senses, and what the camera is determined to perceive. For example, a difference between the sensed location and the perceived location (e.g., in radian) can be provided as a training feature to a classifier (e.g., a logistic model, naïve Bayesian classifier, a support vector machine (SVM), a deep neural network (DNN)) to train the classifier to discriminate between live human subjects and spoof alternative representations.

FIG. 2A is an example system that can be used for implementing technology described herein. The system 200 includes an image acquisition device 205, and image analysis engine 210, and a secure system 215 an access to which is controlled via a biometric authentication system. The image acquisition device 205 can be substantially similar to the camera 104 of the mobile device 102 (FIG. 1A). In some implementations, the image acquisition device can include a video camera that captures a sequence of images of a subject within a time period. In some implementations, the image acquisition device 205 can include one or more position sensors 207 that can be used to estimate a location of the image acquisition device for the purposes described herein. For example, the one or more position sensors 207 can include, for example, an accelerometer, a gyroscope, a magnetometer, and/or other MEMS sensors. In some implementations, the one or more position sensors 207 can include an optical flow sensor or other sensors that can be used for determining a location of the image acquisition device 205.

The system 200 also includes an image analysis engine 210 that can be configured to implement one or more processes in accordance with technology herein. For example, the image analysis engine 210 can select multiple images from a sequence of images captured by the image acquisition device 205, and determine a subject motion using the selected images in accordance with technology described above. In some implementations, the image analysis engine 210 can be located at a remote location with respect to the image acquisition device 205. For example, the image analysis engine 210 can be implemented on a server that is remotely located with respect to a mobile device on which the image acquisition device 205 is disposed. In such cases, the image acquisition device 205 can be in communication with the image analysis engine 210 over one or more networks. In some implementations, at least a portion of the image analysis engine 210 can be located on the same device with the image acquisition device 205.

Figure 2B:
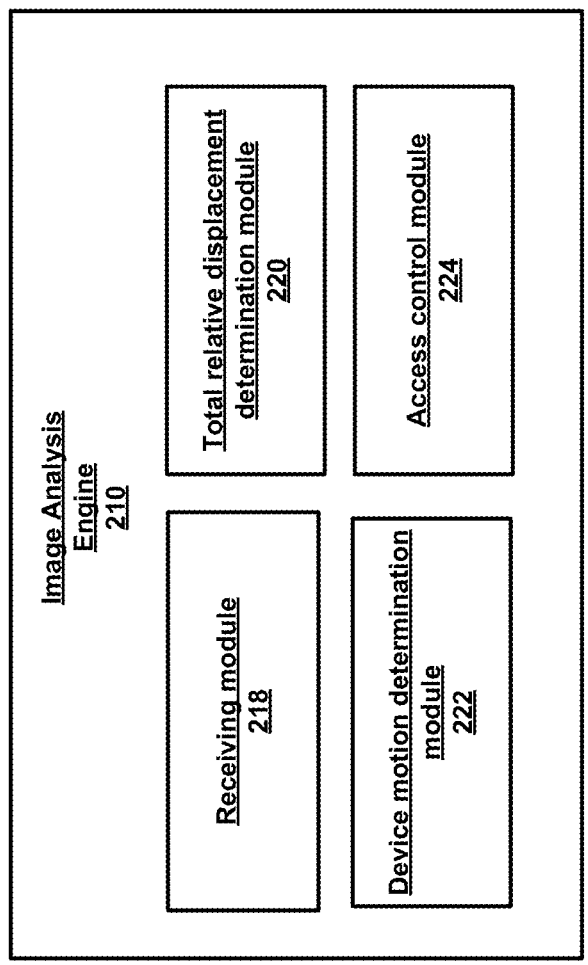
FIG. 2B is a block diagram of an example of an image analysis engine.

The image analysis engine 210 can be interchangeably referred to as an image analysis module, and can include multiple modules, for example, a receiving module 218 and an analysis module 220, as shown in FIG. 2B. The receiving module 218 can include a wired or wireless transceiver, and be configured to receive a first image and a second image, wherein the first image represents a first relative location of the image acquisition device with respect to a subject, and the second image represents a second relative location, different from the first relative location, of the image acquisition device with respect to the subject. In some implementations, the receiving module can include one or more processing devices. In some implementations, the image analysis engine 210 includes a total relative displacement determination module 220 that determines, using the first image and the second image, a total relative displacement of the first subject with respect to the image acquisition device between a time of capture of the first image and a time of capture of the second image. The image analysis engine 210 can also include a device motion determination module 222 that determines, based on sensor data associated with one or more sensors associated with the image acquisition device, a component of the total relative displacement associated with a motion of the image acquisition device. The device motion determination module 222 can communicate with the position sensors 207 in computing the component. The image analysis engine can also include an access control module 224 determines, based on a difference between the total relative displacement and the component of the total relative displacement attributable to the motion of the image acquisition device, that the subject is an alternative representation of a live person, and in response, preventing access to a secure system. In some implementations, the access control module 224 can determine that the subject is a live person, and grant access accordingly.

In some implementations, the image analysis engine 210 can include (or communicate with) a biometric authentication system 212 that controls access to the secure system 215. For example, the image analysis engine can determine, based on the subject motion determined for a subject, that a subject in the images is an alternative representation of a live person. This can happen, for example, during a malicious attempt of unauthorized access to the secure system 215 in which the perpetrator of the attempt points the image acquisition device towards a high quality photograph of an authorized user that is printed on paper, or displayed on a high resolution display device. Responsive to determining that the subject is an alternative representation of a live person, the image analysis engine can preemptively prevent any of the images to be further processed by the biometric authentication system 212, thereby preventing access to a secure system 215. On the other hand, if the image analysis engine 210 determines that the subject of the images is a live person, an authentication process based on one or more images of the captured sequence can be initiated (e.g., at the biometric authentication system 212) to determine if the live person is authorized to access the secure system 215.

Figures 3A, 3B:
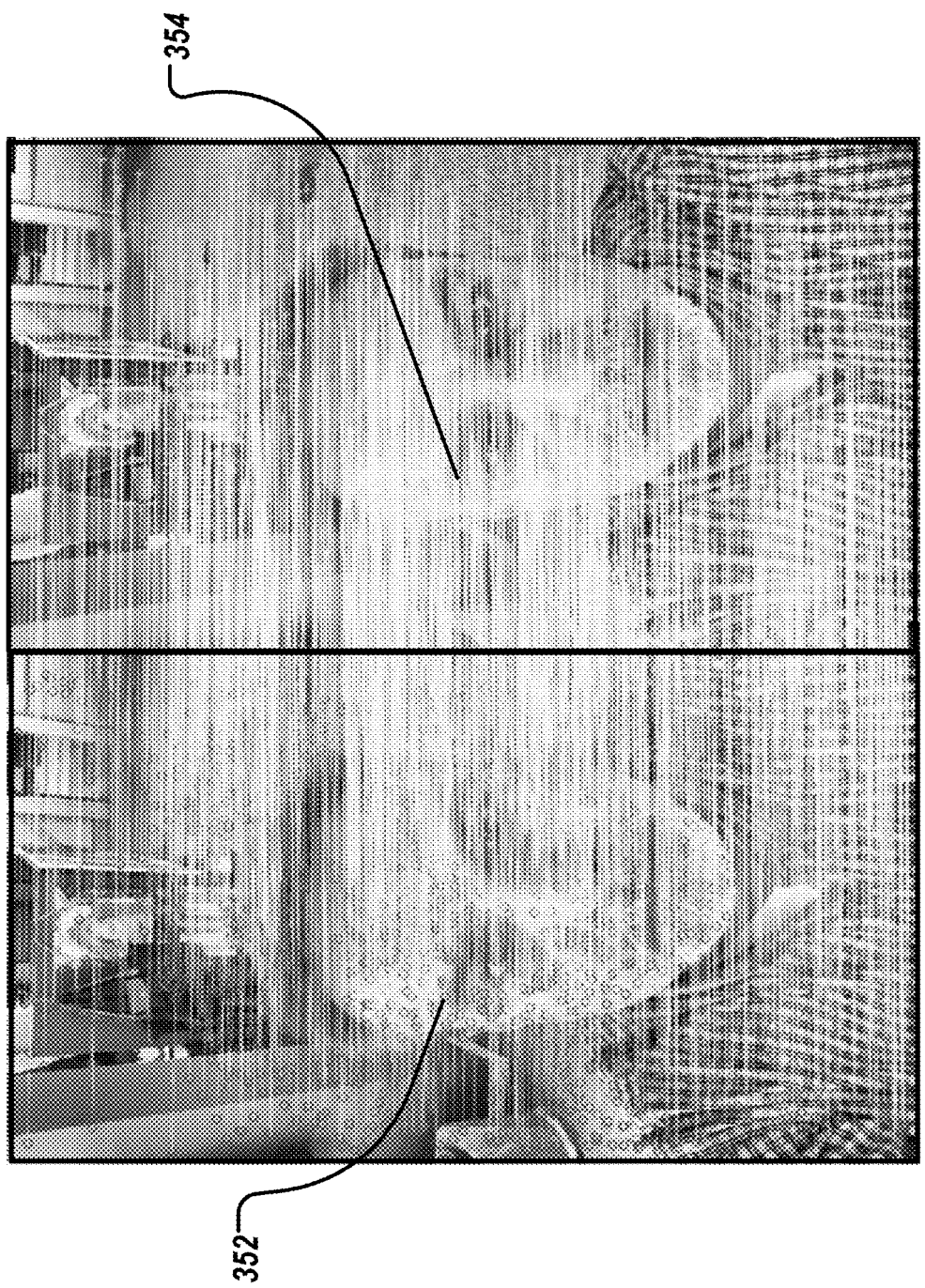
FIGS. 3A and 3B are two pictures that illustrate the technology described herein.

FIGS. 3A and 3B are two images that represent an illustrative example of the technology described herein. Specifically the two images represent a pair of images captured at two different locations of the camera. In some implementations, the image analysis engine 210 processes one of the two images to first identify points of interest in the image. This can correspond to, for example, identifying points that have strong contrast to adjacent points. In FIG. 3A, an example of a point of interest is shown using the reference numeral 352. Once the points of interest are identified in one image, the corresponding points are then identified in the second image, and a displacement of individual points between the two images is then calculated with respect to a reference point. For example, the point 354 in FIG. 3B represents the point corresponding to the point 352 in FIG. 3A. In general, the circles in FIG. 3A represent the points of interest, and the crosses in FIG. 3B represent the corresponding matching points. The lines connecting the corresponding points in FIGS. 3A and 3B show the displacement of the corresponding points between the two images, and may be different for the various points, for example, depending on whether the points are in the foreground or in the background. The total motion observed by the camera can then be calculated, for example, using relative locations of the points 352 and 354 (and those of similar matching pairs of points in the two images), the estimated distance to the subject, one or more camera parameters (i.e. the calibration information on focal characteristics, etc.), and the fundamental matrix that describes the difference in orientation of the camera between the two images. This total motion is then compared to the motion of the camera as sensed using the motion sensors of the camera. For example, under the assumption that the total motion observed by the camera includes the motion of the camera and any motion of the subject, the camera motion determined from the motion sensors is subtracted from the total motion to obtain a motion of the subject. For human subjects, the subject motion is typically above an empirically determined threshold, whereas for spoof alternative representations such as a photograph of a subject, the subject motion is less than such a threshold.

Figure 4:
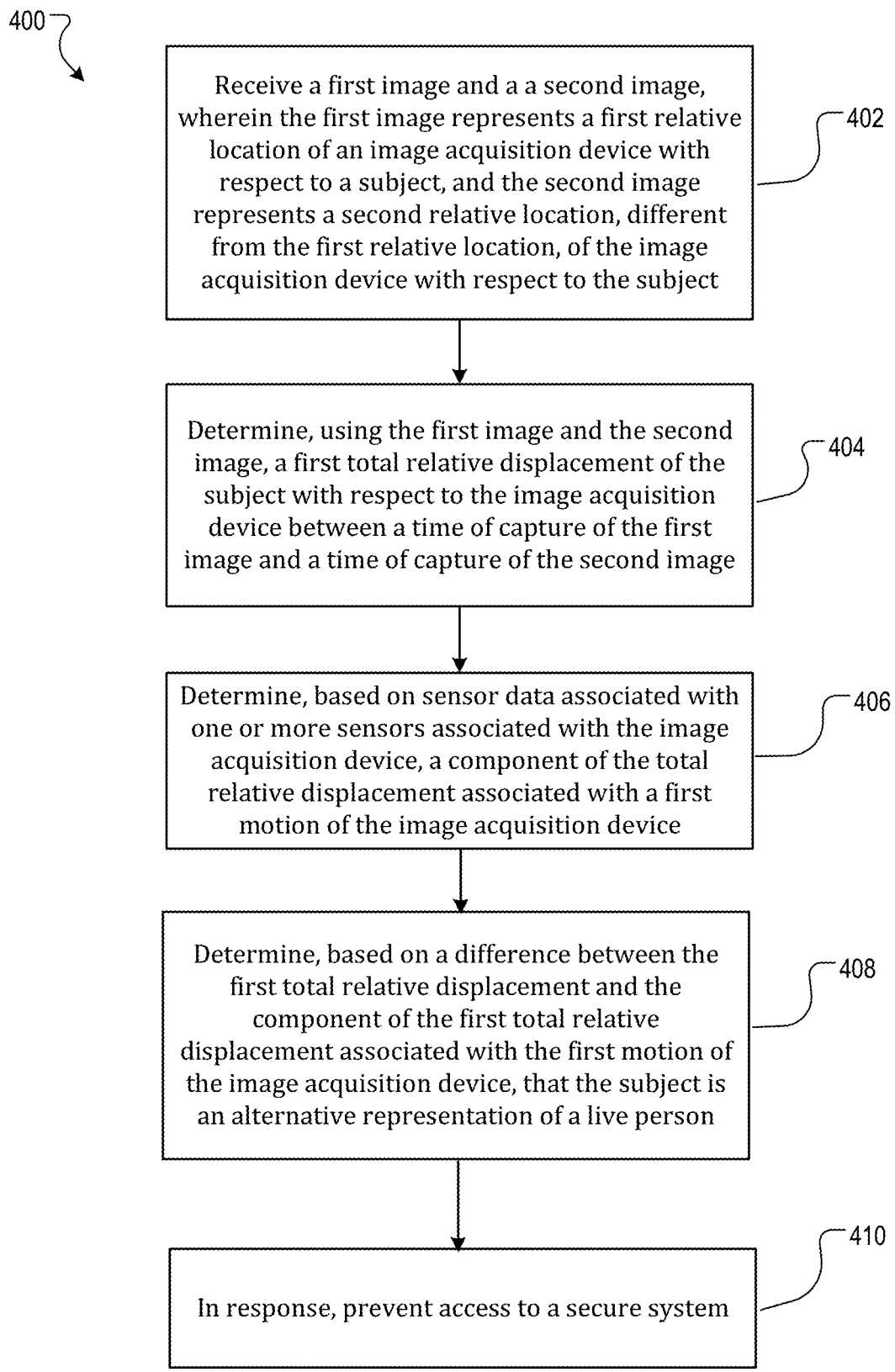
FIG. 4 is a flowchart of an example process for preventing access to a secure system in accordance with technology described herein.

FIG. 4 is a flowchart of an example process 400 for preventing access to a secure system in accordance with technology described herein. In some implementations, at least a portion of the operations of the process 400 can be performed by one or more processing devices of a special purpose computing device such as the image analysis engine 210 described with reference to FIG. 2. Operations of the process 400 includes receiving, at one or more processing devices, a first image and a second image (402). The first image represents a first relative location of an image acquisition device with respect to a subject, and the second image represents a second relative location, different from the first relative location, of the image acquisition device with respect to the first subject. For example, the first image and the second image can be captured from two different locations as a user lifts the image acquisition device (e.g., a camera disposed in a mobile device) towards the subject. The first and second images can be a part of a sequence of images that are captured as the mobile device is moved towards the subject.

Operations of the process 400 also includes determining, using the first image and the second image, a total relative displacement of the first subject with respect to the image acquisition device between a time of capture of the first image and a time of capture of the second image (404). In some implementations, this can be done as described above with reference to the example of FIGS. 3A and 3B. For example, determining the total relative displacement can include identifying multiple points of interest in the first image, identifying, in the second image, points corresponding to each of the multiple points of interest, and determining displacement of the multiple points of interest from the first image to the second image with respect to a reference point. The total relative displacement of the subject can then be determined based on the displacement of the multiple points of interest using (i) an estimated distance between the image acquisition device and the camera, and (ii) one or more camera parameters. In some a fundamental matrix indicative of a difference between the orientations of the image acquisition device at the times of capture of the first image and second image, respectively, may be determined in the process of determining the total relative displacement. The total relative displacement can represent the total motion (as perceived by the camera), which includes the motion perceived due to the motion of the camera, and also any motion of the subject.

Operations of the process 400 also includes determining, based on sensor data associated with one or more sensors associated with the image acquisition device, a component of the total relative displacement associated with a first motion of the image acquisition device (406). This can be done, for example, as described above with reference to FIG. 2A, using one or more position sensors 207 of an image acquisition device. The operations of the process 400 further include determining, based on a difference between the first total relative displacement and the component of the first total relative displacement associated with the first motion of the image acquisition device, that the first subject is an alternative representation of a live person (408). For example, if the difference between the first total relative displacement and the component of the first total relative displacement associated with the first motion of the image acquisition device is less than a threshold, the subject can be determined to be an inanimate object such as a printed photograph or image displayed on a screen, and hence flagged as a likely spoof.

Operations of the process 400 further includes preventing, responsive to determining that the first subject is an alternative representation of a live person, access to a secure system (410). This can preemptively reduce additional operations that may be needed in authenticating a subject to a secure system. On the other hand, if a determination is made that the subject is a live person, an authentication process can be initiated to determine if the live person is authorized to access the secure system.

Figure 5:
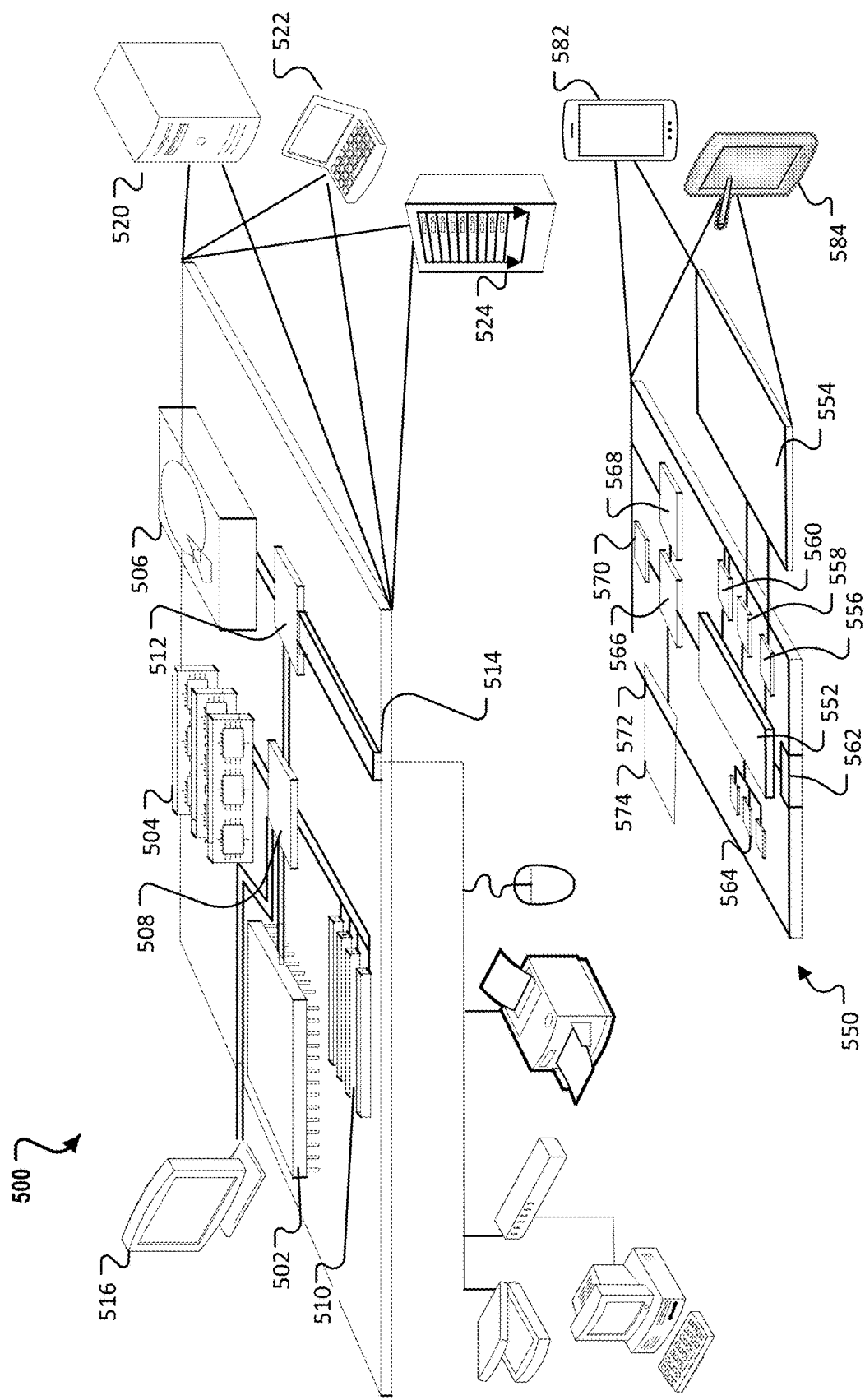
FIG. 5 is a block diagram representing examples of computing devices.

FIG. 5 shows an example of a computing device 500 and a mobile device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer 584, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification the term "engine" is used broadly to refer to a software-based system, subsystem that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications may be made without departing from the scope of the inventive concepts described herein, and, accordingly, other implementations are within the scope of the following claims.

What is claimed is:
1. A method comprising:
receiving, at one or more processing devices, a first image and a second image, wherein the first image represents a first relative location of an image acquisition device with respect to a first subject, and the second image represents a second relative location, different from the first relative location, of the image acquisition device with respect to the first subject;
determining, by the one or more processing devices and using the first image and the second image, a first total relative displacement of the first subject with respect to the image acquisition device between a time of capture of the first image and a time of capture of the second image;
determining, based on sensor data associated with one or more sensors associated with the image acquisition device, a component of the first total relative displacement associated with a first motion of the image acquisition device;
calculating a difference between the first total relative displacement and the component of the first total relative displacement associated with the first motion of the image acquisition device;
in response to determining that the calculated difference between the first total relative displacement and the component of the first total relative displacement associated with the first motion of the image acquisition device is below a threshold difference, determining that the first subject is an alternative representation of a live person; and
responsive to determining that the first subject is an alternative representation of a live person, preventing access to a secure system.

2. The method of claim 1, wherein the image acquisition device is a camera disposed on a mobile device, and the first and second images is a part of a sequence of images captured as the mobile device is moved relative to the first subject.

3. The method of claim 1, wherein the alternative representation of the live person comprises a photograph of the live person printed on paper, or presented on a display device.

4. The method of claim 1, wherein determining the first total relative displacement comprises:
identifying multiple points of interest in the first image;
identifying, in the second image, points corresponding to each of the multiple points of interest;
determining displacement of the multiple points of interest from the first image to the second image with respect to a reference point; and
determining the first total relative displacement of the first subject based on the displacement of the multiple points of interest using (i) an estimated distance between the image acquisition device and the first subject, and (ii) one or more parameters of the image acquisition device.

5. The method of claim 4, further comprising determining a fundamental matrix indicative of a difference between orientations of the image acquisition device at the times of capture of the first image and second image, respectively.

6. The method of claim 1, further comprising:
receiving, at the one or more processing devices, a second sequence of images of a second subject captured by the image acquisition device over a time period in which relative locations of the image acquisition device with respect to the second subject varies;
selecting, by the one or more processing devices, a third image and a fourth image from the second sequence of images, wherein the third image represents a first relative location of the image acquisition device with respect to the second subject, and the fourth image represents a second relative location, different from the first relative location, of the image acquisition device with respect to the second subject;
determining, by the one or more processing devices and using the third image and the fourth image, a second total relative displacement of the second subject with respect to the image acquisition device between a time of capture of the third image and a time of capture of the fourth image;
determining, based on sensor data associated with the one or more sensors associated with the image acquisition device, a component of the second total relative displacement associated with a second motion of the image acquisition device;
calculating a difference between the second total relative displacement and the component of the second total relative displacement associated with the second motion of the image acquisition device;
in response to determining that the calculated difference between the second total relative displacement and the component of the second total relative displacement associated with the second motion of the image acquisition device is below the threshold difference, determining that the second subject is a live person; and
responsive to determining that the second subject is a live person, initiating an authentication process for determining if the live person is authorized to access the secure system.

7. A system comprising:
an image acquisition device that captures a first sequence of images of a first subject over a time period in which relative locations of the image acquisition device with respect to the first subject varies; and
an image analysis engine comprising one or more processing devices, the image analysis engine configured to:
receive the first sequence of images,
select a first image and a second image from the first sequence of images, wherein the first image represents a first relative location of the image acquisition device with respect to the first subject, and the second image represents a second relative location, different from the first relative location, of the image acquisition device with respect to the first subject,
determine, using the first image and the second image, a first total relative displacement of the first subject with respect to the image acquisition device between a time of capture of the first image and a time of capture of the second image,
determine, based on sensor data associated with one or more sensors associated with the image acquisition device, a component of the first total relative displacement associated with a first motion of the image acquisition device,
calculate a difference between the first total relative displacement and the component of the first total relative displacement associated with the first motion of the image acquisition device,
in response to determining that the calculated difference between the first total relative displacement and the component of the first total relative displacement associated with the first motion of the image acquisition device is below a threshold difference, determine that the first subject is an alternative representation of a live person, and
responsive to determining that the first subject is an alternative representation of a live person, prevent access to a secure system.

8. The system of claim 7, wherein the image acquisition device comprises a camera disposed on a mobile device, and the first sequence of images are captured as the mobile device is moved relative to the first subject.

9. The system of claim 8, wherein the alternative representation of the live person comprises a photograph of the live person printed on paper, or presented on a display device.

10. The system of claim 7, wherein determining the first total relative displacement comprises:
identifying multiple points of interest in the first image;
identifying, in the second image, points corresponding to each of the multiple points of interest;
determining displacement of the multiple points of interest from the first image to the second image with respect to a reference point; and
determining the first total relative displacement of the first subject based on the displacement of the multiple points of interest using (i) an estimated distance between the image acquisition device and the first subject, and (ii) one or more parameters of the image acquisition device.

11. The system of claim 10, wherein the image analysis engine determines a fundamental matrix indicative of a difference between orientations of the image acquisition device at the times of capture of the first image and second image, respectively.

12. The system of claim 7, wherein the image analysis engine:

receives a second sequence of images of a second subject captured by the image acquisition device over a time period in which relative locations of the image acquisition device with respect to the second subject varies;

selects a third image and a fourth image from the second sequence of images, wherein the third image represents a first relative location of the image acquisition device with respect to the second subject, and the fourth image represents a second relative location, different from the first relative location, of the image acquisition device with respect to the second subject;

determines, using the third image and the fourth image, a second total relative displacement of the second subject with respect to the image acquisition device between a time of capture of the third image and a time of capture of the fourth image;

determines, based on sensor data associated with the one or more sensors associated with the image acquisition device, a component of the second total relative displacement associated with a second motion of the image acquisition device;

calculate a difference between the second total relative displacement and the component of the second total relative displacement associated with the second motion of the image acquisition device;

in response to determining that the calculated difference between the second total relative displacement and the component of the second total relative displacement associated with the second motion of the image acquisition device is below the threshold difference, determines that the second subject is a live person; and responsive to determining that the second subject is a live person, initiates an authentication process for determining if the live person is authorized to access the secure system.

13. One or more non-transitory machine-readable storage devices having encoded thereon computer readable instructions for causing one or more processing devices to perform operations comprising:

obtaining a first sequence of images of a first subject captured by an image acquisition device over a time period in which relative locations of the image acquisition device with respect to the first subject varies;

selecting a first image and a second image from the first sequence of images, wherein the first image represents a first relative location of the image acquisition device with respect to the first subject, and the second image represents a second relative location, different from the first relative location, of the image acquisition device with respect to the first subject;

determining, using the first image and the second image, a first total relative displacement of the first subject with respect to the image acquisition device between a time of capture of the first image and a time of capture of the second image;

determining, based on sensor data associated with one or more sensors associated with the image acquisition device, a component of the first total relative displacement associated with a first motion of the image acquisition device;

calculating a difference between the first total relative displacement and the component of the first total relative displacement associated with the first motion of the image acquisition device;

in response to determining that the calculated difference between the first total relative displacement and the component of the first total relative displacement associated with the first motion of the image acquisition device is below a threshold difference, determining that the first subject is an alternative representation of a live person; and responsive to determining that the first subject is an alternative representation of a live person, preventing access to a secure system.

14. The one or more non-transitory machine-readable storage devices of claim 13, wherein the image acquisition device is a camera disposed on a mobile device, and the first sequence of images are captured as the mobile device is moved relative to the first subject.

15. The one or more non-transitory machine-readable storage devices of claim 13, wherein the alternative representation of the live person comprises a photograph of the live person printed on paper, or presented on a display device.

16. The one or more non-transitory machine-readable storage devices of claim 13, wherein determining the first total relative displacement comprises:

identifying multiple points of interest in the first image;

identifying, in the second image, points corresponding to each of the multiple points of interest;

determining displacement of the multiple points of interest from the first image to the second image with respect to a reference point; and determining the first total relative displacement of the first subject based on the displacement of the multiple points of interest using (i) an estimated distance between the image acquisition device and the first subject, and (ii) one or more parameters of the image acquisition device.

17. The one or more non-transitory machine-readable storage devices of claim 16, further comprising determining a fundamental matrix indicative of a difference between orientations of the image acquisition device at the times of capture of the first image and second image, respectively.

18. The one or more non-transitory machine-readable storage devices of claim 13, having encoded thereon instructions for performing operations comprising:

obtaining a second sequence of images of a second subject captured by the image acquisition device over a time period in which relative locations of the image acquisition device with respect to the second subject varies;

selecting a third image and a fourth image from the second sequence of images, wherein the third image represents a first relative location of the image acquisition device with respect to the second subject, and the fourth image represents a second relative location, different from the first relative location, of the image acquisition device with respect to the second subject;

determining, using the third image and the fourth image, a second total relative displacement of the second subject with respect to the image acquisition device between a time of capture of the third image and a time of capture of the fourth image determining, based on sensor data associated with the one or more sensors associated with the image acquisition device, a component of the second total relative displacement associated with a second motion of the image acquisition device;

calculating a difference between the second total relative displacement and the component of the second total relative displacement associated with the second motion of the image acquisition device;

in response to determining that the calculated difference between the second total relative displacement and the component of the second total relative displacement associated with the second motion of the image acquisition device is below the threshold difference, determining that the second subject is a live person; and responsive to determining that the second subject is a live person, initiating an authentication process for determining if the live person is authorized to access the secure system.

* * * * *